United States Patent [19]
Singh et al.

[11] Patent Number: 6,153,809
[45] Date of Patent: Nov. 28, 2000

[54] POLYMER COATING FOR IMMOBILIZING SOLUBLE IONS IN A PHOSPHATE CERAMIC PRODUCT

[75] Inventors: Dileep Singh, Naperville; Arun S. Wagh, Orland Park; Kartikey D. Patel, Roselle, all of Ill.

[73] Assignee: The United States of America as represented by the United States Department of Energy, Washington, D.C.

[21] Appl. No.: 09/305,819

[22] Filed: May 5, 1999

[51] Int. Cl.[7] .......................................................... G21F 9/34
[52] U.S. Cl. .................................. 588/255; 588/3; 588/4; 588/10; 588/252; 976/DIG. 385; 501/155
[58] Field of Search ............................... 588/3, 4, 10, 16, 588/252, 255; 976/DIG. 385; 501/155, 45; 428/387, 384; 106/801

[56] References Cited

U.S. PATENT DOCUMENTS

| | | | |
|---|---|---|---|
| 4,315,831 | 2/1982 | Morin et al. | 252/628 |
| 5,318,730 | 6/1994 | Rieser et al. | 252/628 |
| 5,402,455 | 3/1995 | Angelo, II et al. | 376/272 |
| 5,645,518 | 7/1997 | Wagh et al. | 588/252 |
| 5,830,815 | 11/1998 | Wagh et al. | 501/155 |
| 5,846,894 | 12/1998 | Singh et al. | 501/155 |

OTHER PUBLICATIONS

Modified Phosphate Ceramics for Stabilization and Solidification of Salt Mixed Wastes, authored by Dileep Singh, Kartikey Patel, Arun S. Wagh, Seung-Young Jeong, published in the Proceedings of Spectrum '98, International Conference on Decommissioning and Decontamination and on Nuclear and Hazardous Waste Management, Denver, Colorado, Sep. 13–18, 1998.

Modified Phosphate Ceramics for Stabilization of Salt Mixed Wastes, thesis authored by Kartikey Patel, submitted for review on or after May 7, 1998 and defended on Jun. 26, 1998.

U.S. Patent Application Serial No. __/124,822, Continuation–in–part of U.S. Patent Nos. 5,846,894 and 5,830,815.

U.S. Patent Application Serial No. __/617,284, Continuation–in–part of U.S. Patent No. 5,830,815.

PCT Patent Application No. PCT/US97/04132.

Primary Examiner—Tom Dunn
Assistant Examiner—Elin A Warn
Attorney, Agent, or Firm—Bradley W. Smith; Mark P. Dvorscak; William R. Moser

[57] ABSTRACT

A polymer coating is applied to the surface of a phosphate ceramic composite to effectively immobilize soluble salt anions encapsulated within the phosphate ceramic composite. The polymer coating is made from ceramic materials, including at least one inorganic metal compound, that wet and adhere to the surface structure of the phosphate ceramic composite, thereby isolating the soluble salt anions from the environment and ensuring long-term integrity of the phosphate ceramic composite.

17 Claims, 7 Drawing Sheets

IMMOBILIZATION OF SURROGATE WASTE IN MKP CERAMICS

IMMOBILIZATION OF SURROGATE WASTE IN MKP CERAMICS

PHOTOMICROGRAPH OF WASTEFORMS

PHOTOMICROGRAPH OF COATING MATERIAL

PHOTOMICROGRAPH OF COATING MATERIAL

INTERFACE OF COATING AND WASTEFORM

INTERFACE OF COATING AND WASTEFORM

POLYMER COATING FOR IMMOBILIZING SOLUBLE IONS IN A PHOSPHATE CERAMIC PRODUCT

CONTRACTUAL ORIGIN OF THE INVENTION

The United States Government has rights in this invention pursuant to Contract Number W-31-109-ENG-38 between the United States Department of Energy and The University of Chicago, as operator of Argonne National Laboratory.

TECHNICAL FIELD

This invention relates to the use of chemically bonded phosphate ceramics (CBPCs) for immobilizing large volumes of low-level mixed waste material, and, in particular, to a polymeric coating that increases the leach resistance in CBPCs encapsulating waste containing salt anions.

BACKGROUND OF INVENTION

Low-level mixed waste streams are composed of aqueous liquids, heterogeneous debris, inorganic sludge and particulates, organic liquids, and soils. Of particular concern are low-level mixed waste streams that are high in salt content, especially those salt waste streams generated as sludge and solid effluents in nuclear processing applications. For example, the extraction of plutonium and uranium from their ore matrices by the use of strong acids or precipitation techniques produces nitrate salt and heavy metal waste. Chemical compositions typically found in salt waste streams, either high in chloride or high in nitrate, include aluminum trihydroxide, sodium phosphate, MicroCel E ($CaSiO_3$), water, sodium chloride, trichloroethylene, calcium sulfate, sodium nitrate, and oxides of lead, chromium, mercury, iron, cadmium, and nickel, among other compounds.

Stabilization of salt waste requires that the contaminants and soluble salt anions are effectively immobilized. No single stabilization and solidification technology is known to successfully treat and dispose of salt waste, due to the physical and chemical diversity of salt waste streams. Generally, stabilization refers to the conversion of the waste into a less soluble form, while solidification refers to the micro-encapsulation of the waste in a monolithic solid of high structure integrity. Conventional thermal waste treatment methods, such as incineration or vitrification, are expensive and largely unsuitable for the treatment of salt waste streams because of their reliance on high temperature steps that risk the release of volatile contaminants and the generation of undesirable (e.g., pyrophoric) secondary waste streams. In addition, thermal treatments produce hot spots that affect the quality of a solidified final waste form.

A low-temperature approach is to stabilize hazardous waste by using inorganic (e.g., pozzolanic) binders, such as cement, lime, kiln dust, and/or fly ash. Disadvantages of this approach include a high sensitivity to the presence of impurities, high porosity, and low waste loading volume. Organic binders (e.g., thermosetting polymers) are used even less frequently, because of cost and greater complexity of application. Organic binders are not compatible with water-based wastes, unless the waste is first pre-treated and converted to an emulsion or solid, and organic binders are subject to deterioration from environmental factors, including biological action and exposure to ultraviolet light.

Recently, an alternative non-thermal, low-temperature approach has been developed at Argonne National Laboratory for stabilizing and solidifying low-level mixed waste by incorporating or loading the waste into a phosphate ceramic waste form having a high structural integrity. This technique immobilizes the waste by solidification, such that the waste is physically micro-encapsulated within the dense matrix of the phosphate ceramic waste form, and/or stabilizes the waste by converting the waste into their insoluble phosphate forms. Ceramic encapsulation systems are particularly attractive given that the bonds formed in these systems are ether ionic or covalent, and hence stronger than the hydration bonds in cement systems. Also, the ceramic formulation process is exothermic and economical.

Phosphates are particularly good candidates for stabilization of radioactive and hazardous waste, because phosphates of radio nuclides and hazardous metals are essentially insoluble in groundwater. A salient feature of the low-temperature ceramic phosphate formulation process is an acid-base reaction. For example, magnesium phosphate ceramic waste forms have been produced by reacting magnesium oxide (MgO) with phosphoric acid to form a phosphate of magnesium oxide, Newberyite, as represented in the chemical equation (1), below.

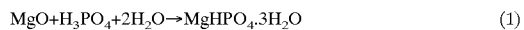

$$MgO + H_3PO_4 + 2H_2O \rightarrow MgHPO_4 \cdot 3H_2O \qquad (1)$$

The acid-base reaction results in the reaction of the waste components with the acid or acid-phosphates, leading to chemical stabilization of the waste. In addition, encapsulation of the waste in the phosphate ceramic results in physical containment of the waste components. The reaction represented above in Equation (1) occurs rapidly and generates heat, and upon evaporation of the water, a porous ceramic product results.

U.S. Pat. No. 5,645,518 issued to Wagh, et al., incorporated herein by reference, describes in detail the process steps for setting liquid or solid waste in CBPC products using acid-base reactions. Accordingly, the process involves mixing ground solid waste, including salt waste spiked with heavy metals, with a starter powder of oxide and hydroxide powders of various elements; slowly adding the waste-powder mixture to an acid solution of phosphoric acid or soluble acid phosphates; thoroughly mixing the waste-powder-acid mixture for about a half hour to an hour at ambient temperatures (less than 100° C.), such that the components of the mixture chemically react to form stable phases and a reacted viscous slurry or paste results; and allowing the slurry or paste to set for a few hours into the final CBPC product. Liquid waste is similarly stabilized by mixing the liquid waste with the acid solution (preferably 50:50), and then reacting the waste-acid mixture with the starting powders. The maximum temperature for the process is about 80° C. The CBPC products attain full strength in about three weeks, and exhibit a complex structure, including a major crystalline phase, e.g., Newberyite ($MgHPO_4 \cdot 3H_2O$), and an insoluble, stable phase. The waste components are generally homogeneously distributed within the phosphate ceramic matrix. Unfortunately, however, the porous product (Newberyite) is unsuitable for waste treatment on a large scale.

U.S. Pat. No. 5,830,815 issued to Wagh, et al., incorporated herein by reference, describes improving the CBPC fabrication process by incorporating two temperature control processes for both reducing heat generation during the encapsulation (reaction) steps and moderating pH conditions (some wastes are unstable at a low pH). The first temperature control process involves pre-treating the phosphoric acid with a carbonate, bicarbonate or hydroxide of a monovalent metal (e.g., K, Na, Li, Rb) prior to mixing with an oxide or hydroxide powder so as to buffer the acid. In particular, potassium containing alkali compounds (e.g., $K_2$, $KHCO_3$, KOH) result in a more crystalline waste form, and the higher the concentration of potassium in the potassium containing compound, the more crystalline the final product, resulting in a higher compression strength, lower porosity, and greater resistance to weathering, compressive forces, and leaching. The second temperature control process involves bypassing the use of the acid and mixing the oxide powder with dihydrogen phosphates of potassium, sodium, lithium, or other monovalent alkali metal, to form a ceramic at a higher pH.

Neutralizing the phosphoric acid solution in equation (1) by adding potassium hydroxide (KOH), as represented in the chemical equation (2) below, reduces the reaction rate and heat generation, and results in the formation of a superior magnesium potassium phosphate (MKP) mineral product, $MgKPO_4 \cdot 6H_2O$ (magnesium potassium phosphate hexahydrate), as represented in chemical equation (3) below.

$$H_3PO_4 + KOH \rightarrow KH_2PO_4 \cdot H_2O \quad (2)$$

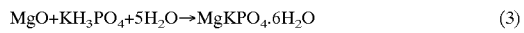

$$MgO + KH_3PO_4 + 5H_2O \rightarrow MgKPO_4 \cdot 6H_2O \quad (3)$$

The chemically bonded ceramic phosphate (CBPC) waste form (e.g, $MgKPO_4 \cdot 6H_2O$) is a dense, hard material with excellent durability and a high resistance to fire, chemicals, humidity, and weather. The low-temperature (e.g., room-temperature) process encapsulates chloride and nitrate salts, along with hazardous metals, in magnesium potassium phosphate (MKP) ceramics, with salt waste loadings of up to between approximately 70 weight percent and approximately 80 weight percent. This durable MKP ceramic product has been extensively developed and used in U.S. Department of Energy waste treatment projects.

Phosphates in general are able to bind with hazardous metals in insoluble complexes over a relatively wide pH range and most metal hydroxides have a higher solubility than their corresponding phosphate forms. In addition to the magnesium and magnesium-potassium phosphate waste products discussed above, known waste encapsulating phosphate systems include, but are not limited to, phosphates of magnesium-ammonium, magnesium-sodium, aluminum, calcium, iron, zinc, and zirconium (zirconium is preferred for cesium encapsulation). A non-exclusive summary of known phosphate systems and processing details is provided in Table I below, selected according to ready availability of materials and literature about the materials, in addition to low cost.

TABLE I

Phosphate Systems and Processing Details

| System | Starting Materials | Solution | Curing Time |
|---|---|---|---|
| MKP | Ground MgO, ground K dihydrophosphate crystals | Water | 1 hour |
| Mg phosphate | Calcined MgO | Phosphoric acid-water (50/50) | >8 days |
| Mg—$NH_4$ phosphate | Crushed dibasic $NH_4$ phosphate crystals mixed w. calcined MgO | Water | 21 days |
| Mg—Na phosphate | Crushed dibasic Na phosphate crystals mixed w. calcined MgO | Water | 21 days |

TABLE I-continued

Phosphate Systems and Processing Details

| System | Starting Materials | Solution | Curing Time |
|---|---|---|---|
| Al phosphate | $Al(OH)_3$ powder | Phosphoric acid (≈60° C.) | Reacted powder, pressed 21 days |
| Zr phosphate | $Zr(OH)_4$ | Phosphoric acid | |

Appropriate oxide powders include, but are not limited to, MgO, $Al(OH)_3$, CaO, FeO, $Fe_2O_3$, $Fe_3O_4$, $Zr(OH)_4$, ZrO, and $TiO_2$, and combinations thereof. The oxide powders may be pre-treated (e.g., heated, calcined, washed) for better reactions with the acids. While no pressure is typically applied to the reacted paste, about 1,000 to 2,000 pounds per square inch may be applied when zirconium-based powders are used.

The acid component may be dilute or concentrated phosphoric acid or acid phosphate solutions, such as dibasic or tribasic sodium, potassium, or aluminum phosphates, and the paste-setting reactions are controllable either by the addition of boric acid to reduce the reaction rate, or by adding powder to the acid while concomitantly controlling the temperature.

Representative bulk constituents for salt waste include, but are not limited to, activated carbon, $Na_2(CO_3)_2$, widely used cation or anion exchange resins, water, NaCl, $Na(NO_3)_2$, $Na_3PO_4$, and $Na_2SO_4$. The salt waste may be reacted with phosphoric acid to any consume carbon dioxide ($CO_2$) present, prior to mixing the salt waste with the oxide powders or binding powders, as the evolution of $CO_2$ results in very porous final ceramic products.

Unfortunately, however, encapsulation of low-level mixed waste into CBPC products is currently of limited practical use for waste that is predominantly comprised of salts, such as chlorides, nitrates, and sulfates. Efforts to encapsulate salt waste in phosphate ceramic products are hampered by low maximum waste loading capacities, because of interference of the salt anions with ceramic-setting reactions, leaching of soluble salt anions from the resulting highly porous ceramic product (especially in aqueous environments), and rapid structural degradation of the ceramic product caused by the high leach rates. Also, environmental stresses degrade the integrity of known CBPC waste forms over time. For example, exposure to repeated cycles of wetting, drying and/or freezing, or acidic or other conditions conducive to leaching may affect the long term effectiveness of waste encapsulated CBPC waste forms.

A need in the art exists for a method for disposing of salt waste that involves a low-temperature stabilization process and improves resistance to leaching, without degrading the integrity of the ceramic phosphate product.

The present invention is a process and product for safely containing radioactive and/or hazardous waste comprised of salt anions in a phosphate ceramic product, involving a new and surprisingly effective immobilization technique. The invented process and product involves the application of a specific polymer coating to the exterior surface of a phosphate ceramic composite encapsulating waste, such that the polymer coating infiltrates the surface structure and adheres to and/or bonds to the phosphate ceramic composite matrix, effectively isolating the waste from the environment and improving the leach resistance of the phosphate ceramic composite. The polymer coating contains at least one inorganic metal compound, preferably an inorganic metal oxide of magnesium or silicon.

Therefore, in view of the above, a basic object of the present invention is to provide an improved process and product for immobilizing hazardous, radioactive, and/or mixed salt waste in phosphate ceramic composites.

Another object of the invention is to provide a safe, low temperature, economical process and product for immobilizing salt waste in a phosphate ceramic product that increases the loading capacity and improves the leach resistance of the salt waste within the phosphate ceramic product.

A further object of the invention is to provide process and product for immobilizing large volumes of salt waste in a durable, long term storage phosphate ceramic product.

Additional objects, advantages, and novel features of the invention are set forth in the description below and/or will become apparent to those skilled in the art upon examination of the description below and/or by practice of the invention. The objects, advantages, and novel features of the invention may be realized and attained by means of instrumentation and combinations particularly pointed out in the appended claims.

BRIEF SUMMARY OF THE INVENTION

Briefly, the present invention is a surprisingly effective process and product for immobilizing waste having a high concentration of salt in chemically bonded phosphate ceramic (CBPC) products. The invention involves a new coating step, wherein a select polymer coating is applied to the surface of a fabricated salt waste loaded CBPC product, such that the coating infiltrates the surface structure of the CBPC product and adheres to the phosphate ceramic matrix, thereby isolating soluble salt anions from the environment and ensuring long-term integrity of the phosphate ceramic system. The fabricated salt waste loaded CBPC product is formulated by methods known in the art.

A critical feature of the invention is the selection of the polymer coating, which contains at least one inorganic metal compound. Preferably, the polymer coating is a polymer resin comprised of fine powders of magnesium oxide and/or silicon oxide. The powders of the coating material act as wetting agents that apparently cause mechanical and/or chemical bonding between the phosphate ester in the surface structure of the CBPC product and the polymer coating composition. The polymer coating infiltrates and macro-encapsulates the CBPC product to improve durability and leach resistance.

BRIEF DESCRIPTION OF THE DRAWINGS

The appended claims set forth those novel features which characterize the invention, however, the invention itself, as well as further objects and advantages thereof, will best be understood with reference to the following detailed description of a preferred embodiment, in conjunction with the accompanying drawings, where like reference characters identify like elements throughout the various figures, in which:

DETAILED DESCRIPTION OF THE INVENTION

Figure 1:
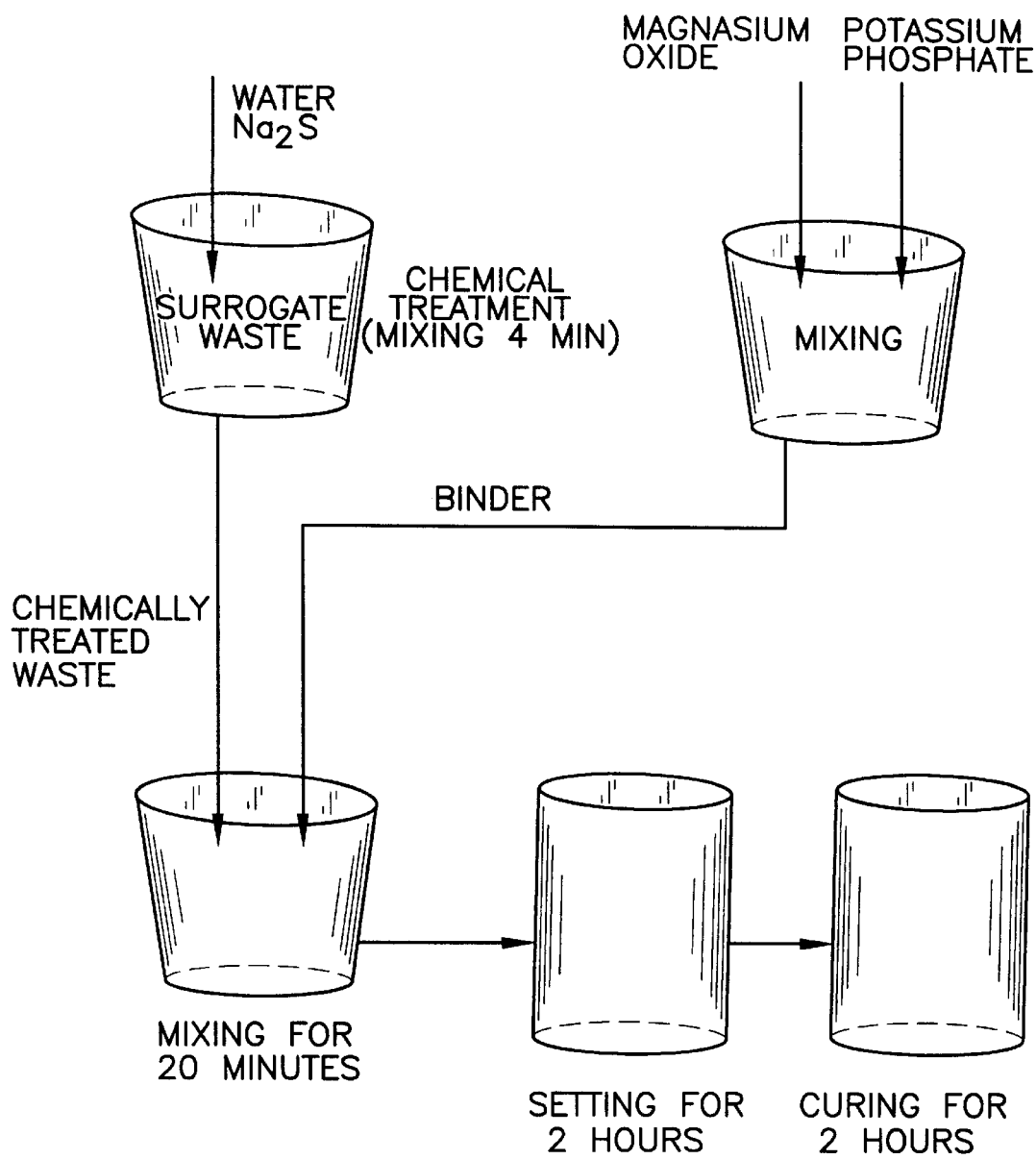
FIG. 1 is a schematic diagram of a method for fabricating magnesium potassium phosphate (MKP) ceramic waste products loaded with surrogate salt waste.

The present invention relates to an improved process and product for immobilizing waste in a chemically bonded phosphate ceramic (CBPC) waste form. As described in detail in the background section above, although methods for fabricating CBPC products encapsulating waste materials are well known, the known CBPC encapsulation methods are ineffective for containing wastes having a high concentration of salt.

The present invention modifies known CBPC encapsulation methods and products to include a unique immobilization step that specifically addresses problems experienced in the art due to the presence of soluble salt anions in the waste stream. According to the present invention, a polymer coating is applied to the exterior surface of the CBPC product to infiltrate the complex surface structure of the CBPC product and bond and/or adhere thereto, such that salt waste is effectively macro-encapsulated with in phosphate ceramic matrix and isolated from the environment. Advantageously, the polymer surface coating protects the CBPC waste form from environmental stresses by providing a greater resistance to air, water, organic liquids, acids, and alkalis, among other conditions. The polymer surface coated CBPC waste form also has improved mechanical properties, such as greater hardness and high abrasion resistance.

The polymer coating has three main components: the binder, the pigment, and the solvent. The binder provides adhesion and cohesion between the coating and the CBPC surface, the pigment is a fine powder that provides the coating with color and hardness, and the solvent is a volatile liquid for dissolving solid or semi-solid binders. The pigment has considerable influence on the consistency of the properties of the polymer coating and contributes to its abrasion and weather resistance.

A feature of the invention is the inclusion of at least one inorganic metal compound in the binder component of the polymer coating. Preferred inorganic metal compounds are inorganic metal oxides, such as magnesium oxide (MgO) and/or silicon oxide ($SiO_2$). These inorganic metal compounds may be in the form of magnesite ($MgCO_3$), talc ($Mg_2(Si_2O_5)_2 \cdot Mg(OH)_2$), or borosilicate glass (i.e., silicate glass with at last 5% boron oxide). These ceramic materials provide an excellent interface adhesion between the polymer coating and the surface and infiltrated structure of the CBPC product, apparently caused by mechanical and chemical interactions between the phosphate ester comprising the CBPC product and the ceramic coating composition. Polymer coating materials that do not contain ceramic, inorganic metal compounds peel off of the surface of the phosphate ceramic product after curing.

The most preferred polymer material is a commercially available thermoset polyester resin that is comprised of a polyester resin binder, magnesite, talc, or soda-lime glass pigment, a styrene monomer solvent, and also a benzoyl peroxide initiator. Generally preferred polymer coatings are comprised of unsaturated polyester resins that are straight-chain polymers having reactive double bonds at intervals along the chain. In their popular form, unsaturated polyester resins are supplied as solutions in vinyl monomer (e.g., styrene), and copolymerization is activated by the addition of an initiator (e.g., organic peroxides or hydroperoxides) and promoters (e.g., metallic dryers, cobalt octoate, naphthenate). Copolymerization results in the cross-linking of polyester chains by the formation of polmerized vinyl monomors.

According to the preferred method of the present invention, the polymer material is applied to the exterior surface of a phosphate ceramic product as a thin film by adding the initiator to the pigment and the binder, mixing the initiator-pigment-binder composition for a few minutes to form a slurry, uniformly coating the exterior surface of the phosphate ceramic product with the slurry, and chemically drying the coating by allowing sufficient time for the slurry to infiltrate the phosphate ceramic product surface, such that the slurry completely wets and adheres to the surface. Although the polymer coating hardens in about ten minutes, a curing time of 24 hours is preferred. The polymer coating is subjected to a chemical drying step, e.g., curing, a process in which the molecules of the binder chemically react with one other to form bonds within the film by primary valences. These bonds are very strong and not susceptible to dissolution by the action of solvents. Thus, a feature of the invention is the subjection of the surface coated CBPC product to a chemical drying step that converts the coating from a fluid to a solid state, wherein chemical reactions occur to anchor the thin film coating to the CBPC surface.

Table II below provides the results of the American Nuclear Society's ANS 16.1 Standard Test for nitrate and chloride loaded polymer coated MKP ceramic products. Generally, the ANS 16.1 Standard Test studies leachability of contaminants contained in matrices in an aqueous environment over time and evaluates retention rates by calculating a leachability index value from the test data. (The leachability index is the negative logarithm of the effective diffusivity coefficient). Sample polymer coated salt loaded MKP ceramic products were placed in the leaching solution for a fixed period of time, after which the leaching solution was analyzed for specific ions. As shown in Table II, the chloride leaching was excessively low, with the chloride ion reading below the detection limit even after a cumulative 96 hours of exposure. The nitrate leaching was relatively higher.

(ND indicates None Detected; * indicates test in progress).

TABLE II

Cumulative Leaching of Chloride and Nitrate Ions from Polymer Coated MKP Ceramic Products

| Cumulative Time (hours) | Chloride Ion (Cl$^-$) (ppm) | Nitrate Ion (NO$_3^-$) (ppm) |
|---|---|---|
| 2 | ND | 3.96 |
| 7 | ND | 5.28 |
| 24 | ND | 2.20 |
| 48 | ND | 3.08 |
| 72 | | 2.64 |
| 96 | ND | 2.20 |
| 456 | 3.4 | 13.20 |
| 1128 | * | 43.12 |
| 2136 | * | 176.00 |

ND indicates None Detected;
*indicates test in progress.

Salt waste is generally highly reactive and therefore its flammability is of concern, in view of transportation and storage issues. Department of Transportation (DOT) oxidation tests conducted on polymer coated salt loaded phosphate ceramic products demonstrated that because phosphate ceramics are inorganic ceramic-type materials, they advantageously inhibit the spread of flames and are an excellent solidification medium for flammable salt waste.

The resulting phosphate ceramic materials may be used to produce building and construction materials, e.g., engineering barrier systems.

EXAMPLE

Nitrate Loaded Polymer Coated MKP Ceramic Product

Surrogate waste having the composition listed below in Table III was prepared in the laboratory and mixed for 72 hours using mixing rollers. The surrogate waste was chemically treated by mixing the surrogate waste first with an aqueous solution containing a small amount of sodium monosulfide ($Na_2S$) for about 8 to 10 minutes to efficiently convert mercury (Hg) into its most stable form of mercury sulfide (HgS), and next treating the surrogate waste with tin chloride ($SnCl_2$) for about 5 minutes to reduce the valency of chromium from +6 to a less toxic, less water soluble oxidation state of +3.

TABLE III

Surrogate Waste Composition

| Constituent | wt % | Contaminant | ppm |
|---|---|---|---|
| $Fe_2O_3$ | 6.0 | PbO | 1000 |
| $Al_2(OH)_3$ | 4.0 | $CrO_3$ | 1000 |
| $Na_3PO_4$ | 2.0 | HgO | 1000 |
| $Mg(OH)_2$ | 4.0 | CdO | 1000 |
| $CaSiO_3$ | 8.0 | NiO | 1000 |
| Portland Cement | 2.0 | | |
| $H_2O$ | 14.0 | | |
| $NaNO_3$ (nitrate salt) | 60.0 | | |

Magnesium potassium phosphate (MKP) ceramic waste products incorporating the surrogate waste were fabricated by methods generally shown in FIG. 1 for waste loadings of 58% and 70%. Accordingly, a binder was formed by spontaneously reacting a stoichiometric amount of well mixed, calcined magnesium oxide (MgO) powder and monopotassium phosphate ($KH_2PO_4$), under aqueous conditions and constant stirring, in four successive batches at one minute intervals, to produce magnesium potassium phosphate ($MgKPO_4 \cdot 6H_2O$), according to Equation (3) above. The resulting binder has a highly crystalline ceramic structure and a solubility product constant as low as $10^{-12}$.

The chemically treated surrogate waste and binder were combined to form a slurry that initially experienced a few degrees decrease in temperature due to the dissolution of the phosphate crystals in the water. Upon dissolution of the phosphate, the temperature increased to about 35° C., and the slurry having a pH of about 6 to 7 was stirred thoroughly for about 18 to 20 minutes, or until the slurry started to set. The slurry was hardened in molds for about 2 to 5 hours, resulting in dense, monolithic, chemically bonded phosphate ceramic (CBPC) waste products. After 14 days of curing, the CBPC waste products were subjected to variance performance tests, including strength, leaching and characterization.

Figure 2:
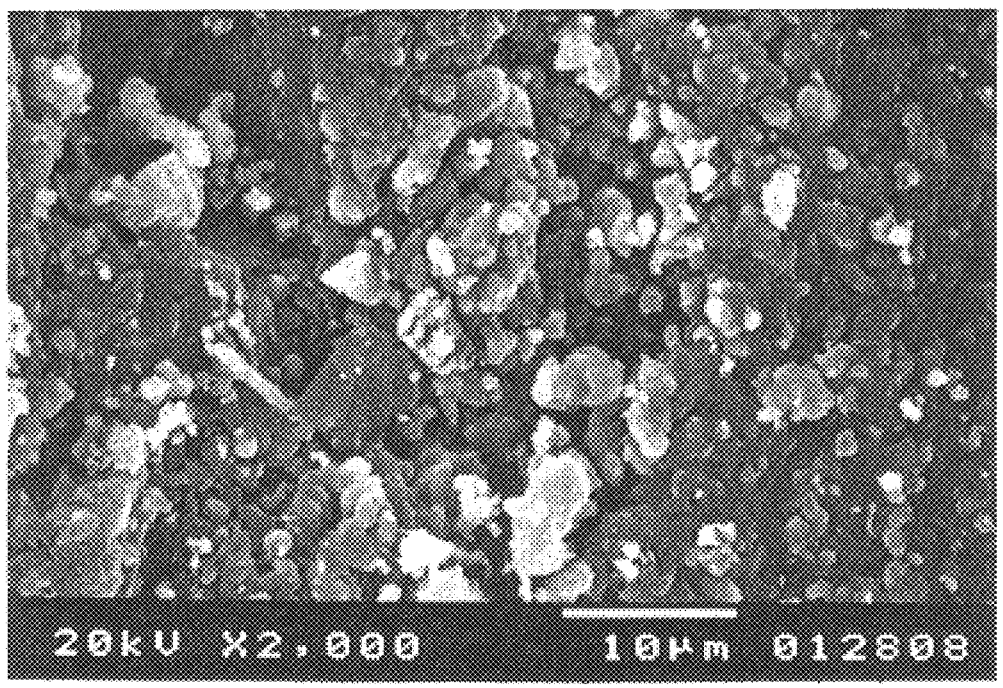
FIG. 2 is a scanning electron microscopy (SEM) photomicrograph of a fractured surface of an MKP ceramic waste product loaded with 58% surrogate salt waste.

FIG. 2 is a high magnification (2000×) scanning electron microscopy (SEM) photomicrograph of a fractured surface of a magnesium potassium phosphate (MKP) ceramic waste product loaded with 58% surrogate salt waste. The photomicrograph shows a very dense, crystalline structure with a small amount of pores. Pores allow water to penetrate the waste form, causing nitrates to (e.g., $NaNO_3$) to dissolve and leach into the environment.

Figure 3:
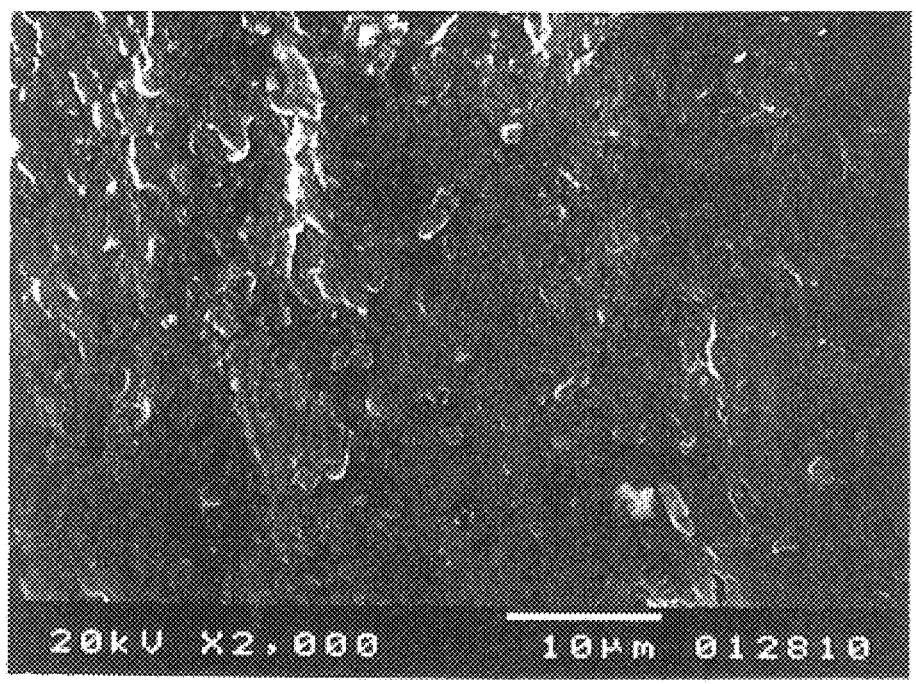
FIG. 3 is a high magnification (2000×) scanning electron microscopy (SEM) photomicrograph of the surface of a polymer coated MKP ceramic waste product loaded with surrogate salt.
Figure 4:
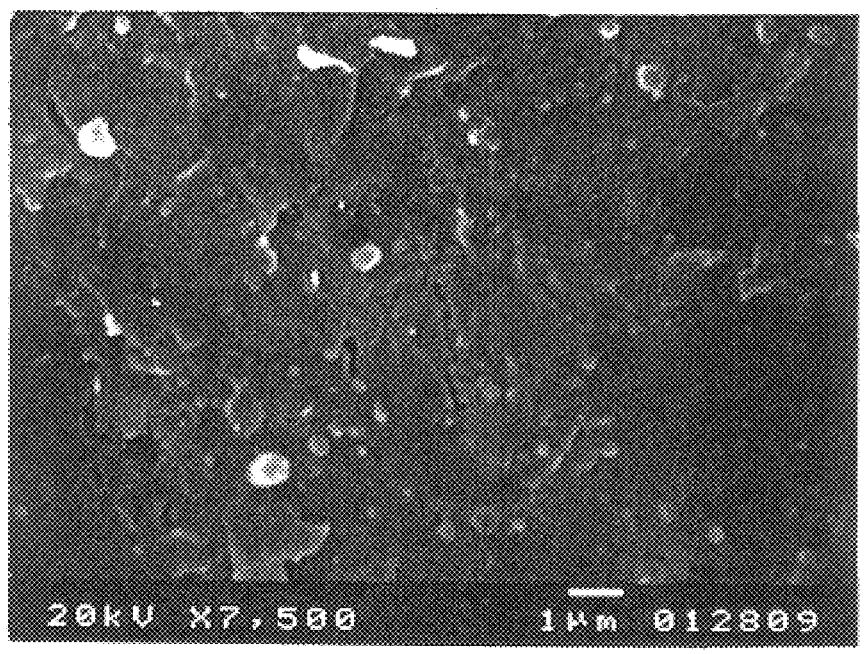
FIG. 4 is a very high magnification (7500×) scanning electron microscopy (SEM) photomicrograph of the surface of a polymer coated MKP ceramic waste product loaded with surrogate salt waste.
Figure 5:
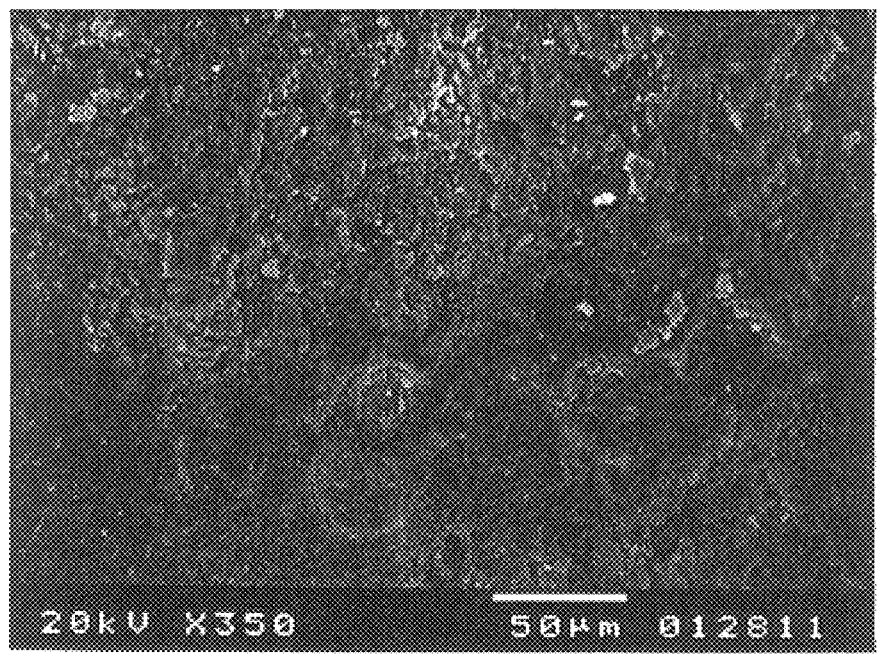
FIG. 5 is a low magnification (350×) scanning electron microscopy (SEM) photomicrograph of the interface between a MKP ceramic waste product loaded with surrogate salt waste and a polymer coating applied thereon.
Figure 6:
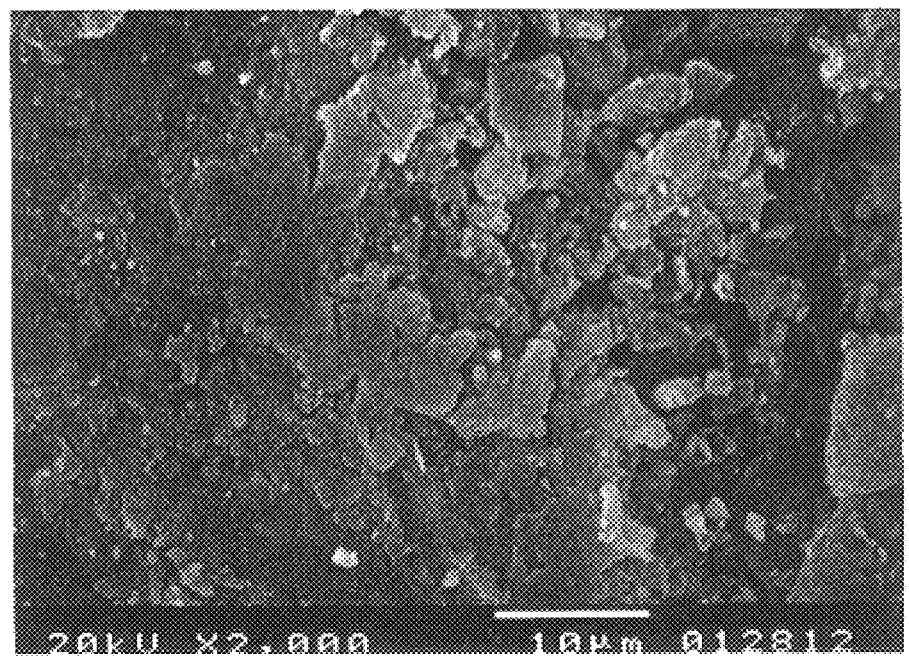
FIG. 6 is a high magnification (2000×) scanning electron microscopy (SEM) photomicrograph of the interface between a MKP ceramic waste product loaded with surrogate salt waste and a polymer coating applied thereon.

According to the present invention, a select number of the CBPC waste products were coated with an unsaturated polyester resin system to further immobilize the surrogate waste within the CBPC waste products. FIGS. 3 and 4 show high (2000×) and very high (7500×) magnification SEM photomicrographs, respectively, of the polymer coated surface of a CBPC waste product. The photomicrographs show a very smooth, substantially pore free surface structure, demonstrating a very low possibility for water to penetrate into the polymer coated CBPC waste product through its surface structure, and the prevention of nitrate dissolution and subsequent leaching. FIGS. 5 and 6 show low (350×) and high (2000×) magnification SEM micrographs of the interface between a CBPC waste product loaded with surrogate waste and a polymer coating applied thereon. As shown in FIGS. 5 and 6, the polymer coating has completely wet and adhered to the phosphate ceramic surface, resulting in a CBPC waste product having superior leaching performance. The polymer coating-CBPC waste product interface also appears to be essentially free of cracks demonstrating high compression strength and excellent compatibility between the polymer coating and the CBPC waste product.

Table IV below provides the results of density and compression strength tests conducted on the uncoated and polymer coated magnesium potassium phosphate (MKP) ceramic products loaded with 58 weight percent and 70 weight percent nitrate salts. The compression strength of the waste forms are well above of the Nuclear Regulatory Commission (NRC) minimum requirement of 500 psi.

TABLE IV

Structure Properties of MKP and Nitrate Waste Products

| Property | Uncoated 58 wt % Salt Waste | Uncoated 70 wt % Salt Waste | Polymer Coated 58 wt % Salt Waste |
|---|---|---|---|
| Density (g/cc) | 1.893 | 2.000 | 1.691 |
| Compression Strength (PSI) | 1400 ± 160 | 1900 ± 180 | 1970 |

Figure 7:
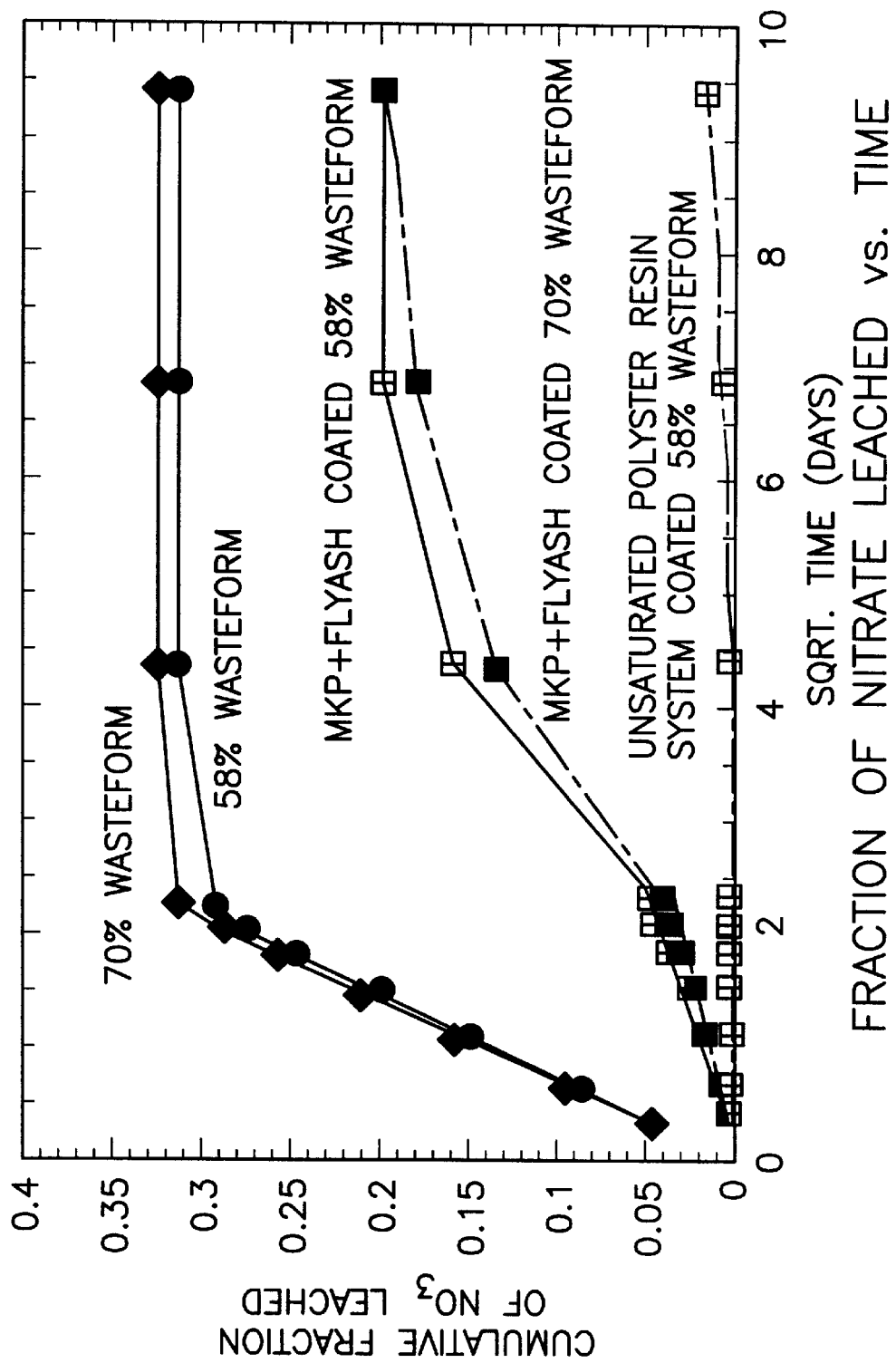
FIG. 7 is a graphical illustration of cumulative nitrate leaching for MKP ceramic products with and without the invented polymer coating.

FIG. 7 is a graphical illustration of cumulative nitrate leaching for nitrate loaded MKP ceramic products with and without the polymer (unsaturated polyester resin) coating. As depicted, the polymer coated nitrate loaded MKP ceramic product immobilized the nitrate ions significantly more effectively than the uncoated nitrate loaded MKP ceramic product. A comparison of the leachability index for the polymer coated nitrate loaded MKP ceramic product versus an uncoated nitrate loaded MKP ceramic product is provided in Table V, below. The calculated leachability index for the polymer coated nitrate loaded MKP ceramic product was greater than 12, substantially above the ANS 16.1 standard leachability index of at least 6.0. Generally, the leachability index is related to the effective diffusivity in that the higher the leachability index, the lower is the effective diffusivity, resulting in a more favorable retention of a contaminant within a matrix. These results demonstrate that the essentially pore free surface structure of the polymer coated salt waste loaded MKP ceramic product provides superior immobilization of the waste salts than uncoated salt loaded phosphate ceramic products currently known in the art.

TABLE V

ANS 16.1 Results for Various Waste Containment Products

| Waste Containment Product | $NO_3^-$ in Waste Containment Product (ppm) | Fraction of $NO_3^-$ Leached Out | Effective Diffusivity (cm²/s) | Leachability Index (LI) |
|---|---|---|---|---|
| Uncoated, 58 wt % Loaded | 218700 | 0.33 | $6.31 \times 10^{-8}$ | 7.20 |
| Uncoated, 70 wt % Loaded | 260600 | 0.35 | $5.82 \times 10^{-8}$ | 7.24 |
| Polymer Coated 58 wt % Loaded | 218700 | 0.0169 | $6.87 \times 10^{-13}$ | 12.16 |

Alternative coating systems were tested, including fly ash coatings, epoxy resins, and rubber derivatives. The fly ash coating system exhibited excellent film integrity and good waste form compatibility, while the epoxy resin and rubber derivative coating systems demonstrated very poor film integrity and waste form compatibility.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiments described explain the principles of the invention and practical applications and should enable others skilled in the art to utilize the invention in various embodiments and with various modifications as are suited to the particular use contemplated. While the invention has been described with reference to details of the illustrated embodiment, these details are not intended to limit the scope of the invention, rather the scope of the invention is to be defined by the claims appended hereto.

The embodiments of the invention in which an exclusive property or privilege is claimed are defined as follows:

1. A phosphate ceramic encapsulation system for immobilizing waste, comprising:

a solid phosphate ceramic waste composite where said composite comprises a waste product which is physically micro-encapsulated within a dense matrix of a phosphate ceramic product and where said solid composite forms a solid body with an external surface area; and a polymer coating comprised of at least one inorganic metal compound where said polymer coating adheres to said external surface area of said ceramic waste composite isolating said ceramic waste composite from an external environment and is comprised of three main components a binder, a pigment and a solvent.

2. The phosphate ceramic encapsulation system according to claim 1, wherein the binder component of the polymer coating contains at least one metal oxide comprised of at least one metal selected from a group consisting of magnesium and silicon.

3. The phosphate ceramic encapsulation system according to claim 1, wherein the polymer coating is comprised of an unsaturated polyester resin.

4. The phosphate ceramic encapsulation system, according to claim 1, wherein the polymer coating is a thermoset polyester resin comprised of a polyester resin binder, a styrene monomer solvent, a benzoyl peroxide initiator, and a pigment selected from the group consisting of magnesite, talc, soda-lime glass, and borosilicate glass, or a combination thereof where the pigment provides color and hardness thus, contributing to the coatings abrasion and weather resistance.

5. The phosphate ceramic encapsulation system according to claim 1, wherein the waste contains a salt selected from the group consisting of chlorides, nitrates, nitrides, sulfites, and sulfates.

6. The phosphate ceramic encapsulation system according to claim 1, wherein the phosphate ceramic composite comprises a phosphate of a compound selected from the group consisting of magnesium, magnesium-ammonium, magnesium-potassium, magnesium-sodium, aluminum, calcium, iron, zinc, and zirconium.

7. A process for immobilizing salt waste in a solid phosphate ceramic waste form, comprising the steps of:

providing a solid phosphate ceramic composite where said composite comprises a salt waste which is physically micro-encapsulated within a dense matrix of a phosphate ceramic product and where said solid composite forms a solid body having an external surface area;

preparing a polymer coating whose composition is comprised of at least one inorganic metal compound;

applying the polymer coating to the surface of the solid phosphate ceramic composite;

allowing the polymer coating to infiltrate a surface structure associated with the external surface area, such that the polymer coating adheres to the surface structure; and allowing the polymer coating to harden by curing, thereby effectively isolating the salt waste from the environment.

8. The process according to claim 7, wherein the step of allowing the polymer coating to infiltrate the surface structure of the phosphate ceramic composite takes less than 15 minutes.

9. The process according to claim 7, wherein the step of allowing the polymer coating to harden takes about 24 hours.

10. The process according to claim 7, wherein the polymer coating includes an inorganic metal oxide powder where the inorganic metal oxide contains an inorganic metal selected from a group consisting of magnesium and silicon.

11. The process according to claim 7, wherein the polymer coating is comprised of an unsaturated polyester resin.

12. The process according to claim 7, wherein the polymer coating is a thermoset polyester resin comprised of a polyester resin binder, a styrene monomer solvent, a benzoyl peroxide initiator, and a pigment selected from the group consisting of magnesite, talc, and soda-lime glass, borosilicate glass or a combination thereof where said pigment provides the polymer coating with color and hardness thus, contributing to the coatings abrasion and weather resistance.

13. The process according to claim 7, wherein the salt is selected from the group consisting of chlorides, nitrates, nitrides, sulfites, and sulfates.

14. The process according to claim 7, wherein the waste is comprised of a salt.

15. The process according to claim 7, wherein the phosphate ceramic composite comprises a phosphate of a compound selected from the group consisting of magnesium, magnesium-ammonium, magnesium-potassium, magnesium-sodium, aluminum, calcium, iron, zinc, and zirconium.

16. An improved method for immobilizing salt waste within a phosphate ceramic composite, comprising the steps of combining salt waste with a starter oxide to obtain a powder, contacting the powder with a phosphate-containing solution to create phosphates of the oxide in a slurry, mixing the slurry while maintaining the slurry below a predetermined temperature, allowing the slurry to set into a phosphate ceramic composite having a crystalline structure, thereby chemically and physically encapsulating the salt waste within the crystalline structure of the phosphate ceramic composite to form a solid mass, wherein the improvement comprises:

applying a polymer coating comprised of at least one inorganic metal compound to a surface of the solid phosphate ceramic product;

allowing the polymer coating to infiltrate the crystalline structure of the surface of the phosphate ceramic composite, such that the polymer coating adheres to the structure; and allowing the polymer coating to harden by curing, thereby effectively isolating the salt waste from the environment.

17. The process according to claim 16, wherein the inorganic metal compound is comprised of an oxide powder whose inorganic metal is selected from a group consisting of magnesium and silicon.

* * * * *